Oct. 13, 1970    P. CAIRD    3,533,559

AIR INJECTION-PROVIDING HOSE NOZZLE

Filed April 5, 1968    2 Sheets-Sheet 1

INVENTOR

Peter Caird

BY Eugene E. Stevens and/or
Raymond H. Stevens

ATTORNEYS

Oct. 13, 1970    P. CAIRD    3,533,559
AIR INJECTION-PROVIDING HOSE NOZZLE
Filed April 5, 1968    2 Sheets-Sheet 2
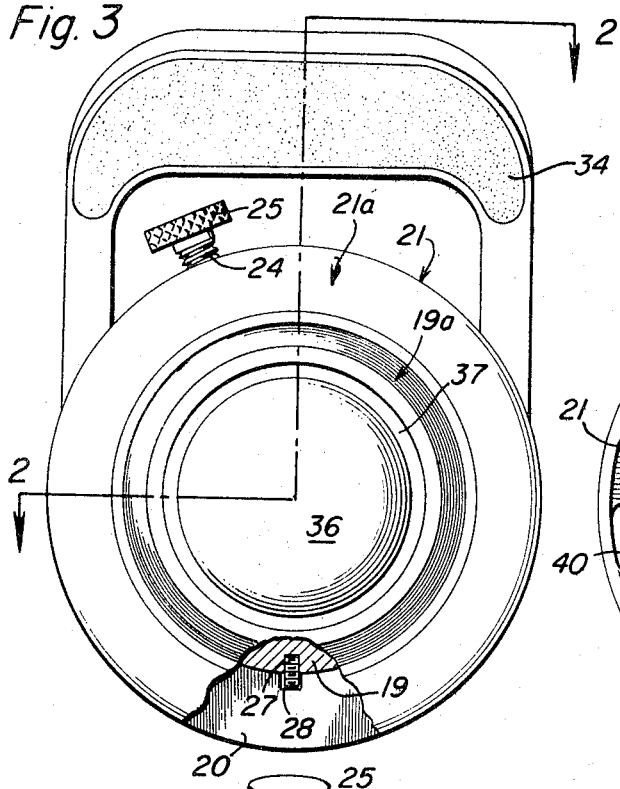
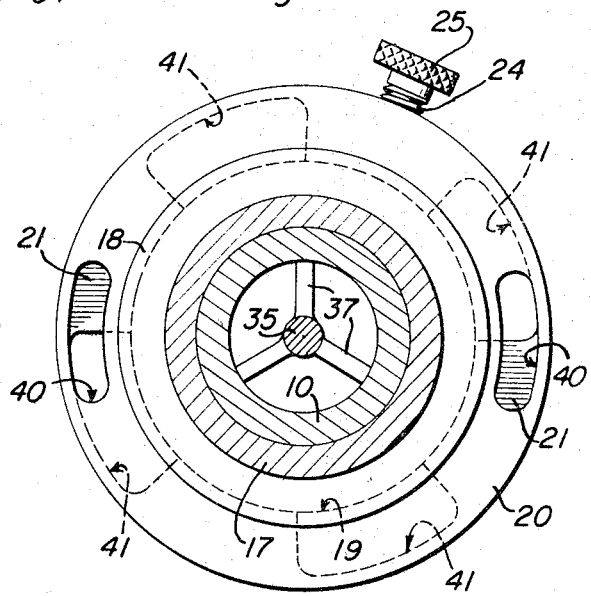
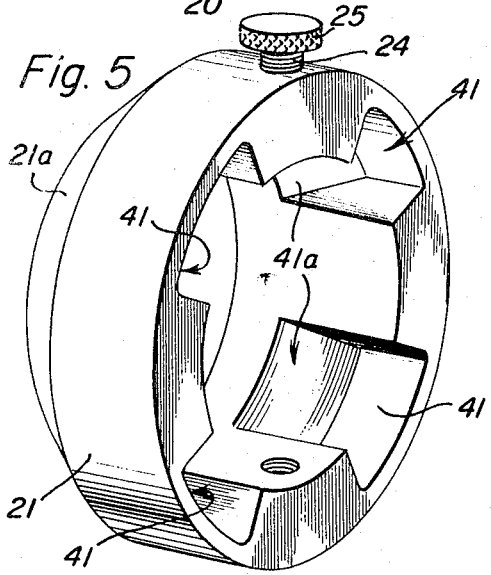
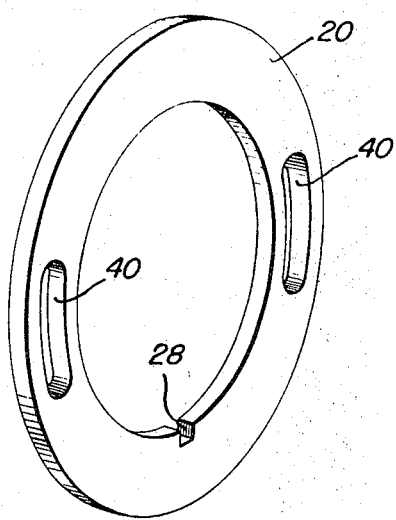
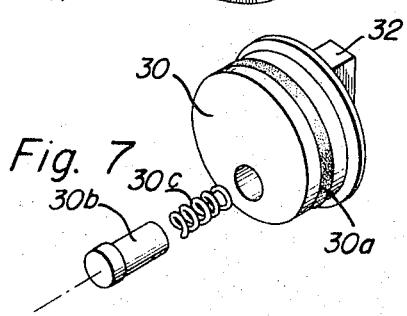
INVENTOR
Peter Caird
BY Eugene E. Stevens and/or Raymond H. Stevens
ATTORNEYS

United States Patent Office 3,533,559
Patented Oct. 13, 1970

3,533,559
AIR INJECTION-PROVIDING HOSE NOZZLE
Peter Caird, 1100 High School Road,
Sebastopol, Calif. 95472
Filed Apr. 5, 1968, Ser. No. 718,999
Int. Cl. B05b 1/32
U.S. Cl. 239—419.5                          3 Claims

ABSTRACT OF THE DISCLOSURE

A water nozzle which carries a fixed disc enlargement and a tapered head in front of the same. The head is keyed to the nozzle for rotary adjustment, and has a circularly-spaced series of passages adapted to register variably with similarly-positioned slots in the disc. A set screw fixes the adjustment of the head to vary the amount of air drawn through it by the water stream.

---

The present invention relates to improvements in fire hose nozzles, such as that disclosed in my Pat. No. 3,210,-012, dated Oct. 5, 1965. A primary object of the invention is to incorporate in such nozzle means for advantageously mixing air with the water at, or adjacent to the discharge end of the nozzle. The invention is especially effective in producing a better foam or mist discharge when the nozzle is adjusted for the latter, instead of a cylindrical fluid stream discharge.

Another object of the invention is to provide means for the purpose specified which is (1) simple in construction and thus inexpensive to manufacture; (2) easy to operate; and (3) can be readily produced as an attachment to conventional fire hose nozzles without substantial modification of the latter.

Other detailed objects and advantages of the invention will be readily understood and appreciated by those versed in the art upon reference to the accompanying drawings which show a preferred example of the present inventive concept.

It is to be understood, however, that the herein disclosed and described example of the invention is to be taken as illustrative rather than limitative, as the present improvements are susceptible of other mechanical expressions within the spirit and scope of the subject matter claimed hereinafter.

In the drawings, wherein the same reference characters have been used to designate the same parts wherever they appear in the several views:

FIG. 3 is a front end view, partly broken away;

FIG. 4 is a section taken on the line 4—4 of FIG. 2;

FIG. 5 is a perspective view of the adjustable air-supply control member of FIGS. 1, 2 and 3;

FIG. 6 is a perspective view of a fixed air-admission disc; and

FIG. 7 is a group perspective of a controlling cam and its related parts.

Figure 1:
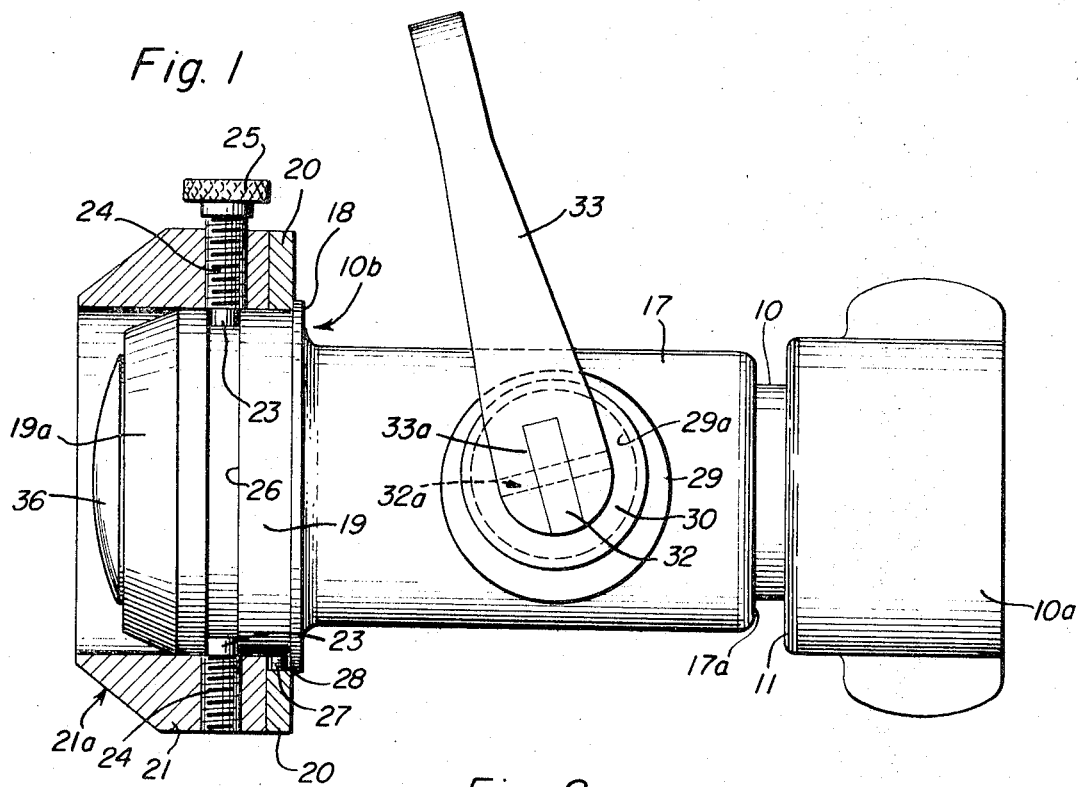
FIG. 1 is a side elevational view of the improved nozzle generally similar to that shown in the aforesaid patent, but with the air-supply attachment shown in section.

Referring specifically to the drawings, numeral 10 designates a tubular base member which has an enlarged rear end 10a providing an exterior shoulder 11. The base member 10 also has a threaded rear hose end-receiving socket 12 whose forward end has a circumferential groove 13 for a hose-end abutting gasket 14. A counterbore 15, communicating with socket 12 defines the circumferential inner end shoulder 16 to be referred to later on.

A fluid flow control sleeve 17 is exteriorly slidable on base 10, and it inner end 17a engages the exterior base-provided shoulder 11 to limit rearward sleeve movement. The enlarged forward sleeve end is generally designated at 10b and provides the rear circumferential flange 18.

Flange 18 acts as a rearward movement-limiting stop for the novel adjustable air supply assembly 20, 21, etc., which is mounted on the enlarged cylindrical front end portion 19 of sleeve 17 and operates to supply air to the fluid stream that is discharged from the outer end of the nozzle base member, as will be explained hereinafter.

Figure 2:
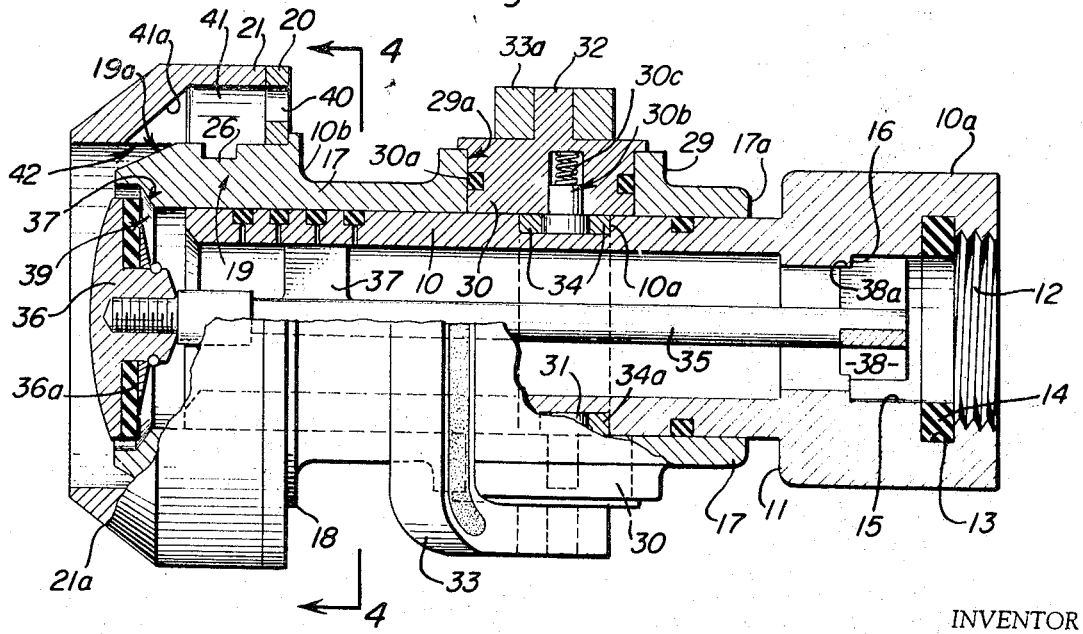
FIG. 2 is a horizontal section of the showing in FIG. 1, partly in elevation.

The outer end 19a of the frontal sleeve portion 19 tapers to reduced diameter, as shown in FIGS. 1 and 2. These figures also show that a rotatable head 21 of the air-supply assembly 20–21 encircles the sleeve portion 19 and receives a radial screw 24 formed with a knurled outer head 25 and an inner tip 23, the latter extending into a circumferential groove 26 made in the sleeve portion 19; and a similar screw 25 is driven into the head 21 from the opposite side, to project a tip 23 into the groove 26. This is not only to retain the assembly 20–21 in place, but also to lock the head 21 in any position to which it may be turned.

A marginal screw 27 projects from the enlarged portion 19 of the sleeve 17 to engage in an interior notch 28 of the disc 20 to retain the latter against rotation with the head 21. The above noted air-supply assembly 20–21 and its operation will be described in detail hereinafter.

Intermediate its ends, the sleeve portion 17 is extended on opposite sides with bosses 29 which are bored in axial alignment at 29a to receive cylindrical cams 30, each formed with an annular gasket-receiving groove 30a.

The cams 30 have outward axis-crossing rectangular keys 32 (see FIGS. 1, 2 and 7) which are fitted into the terminals 33a of the arched handle 33 and secured by cross-pins 32a (see FIG. 1). The tubular base 10 is formed with circular groove 10c opposite the cams 30, the groove 10c being eccentrically positioned relative to the cams 30. The groove 10c seats laterally spaced wear rings 34 defining an annular space 34a into which pins 30b from the cams project. Thus, a rearward swing of the handle 33 from the position of FIG. 1 will rotate the cams 30 and advance the sleeve 17 along the base 10. FIGS. 2 and 7 show that the pins 30b are slidable in the cams 30 and urged into groove 10c by backing springs 30c.

FIG. 2 shows a stem 35 positioned centrally within the tubular base 10, and extending in parallelism therewith to receive a frontal poppet valve-like baffle-form fluid deflector 36. The stem extends in the front and rear region with spider arms 37, 38 meeting the internal wall of the base 10 in order to fix the central position of the stem 35. Also, the latter is limited against forward movement by rear-end notches 38a of spider arms 38 which seat against an internal shoulder 16 of the rear enlargement 10a of base 10.

The front end portion of the sleeve enlargement 19 has an internal chamfer 39 which is shown in FIG. 2 spaced from a backing gasket 36a on the rear surface of the poppet valve-like fluid deflector 36 to provide a fluid cut-off valve seat for 36a when handle 33 is actuated to move sleeve 17 to its forward limit which is to say, leftwardly as viewed in FIGS. 1 and 2.

FIGS. 1 and 2 show that forward end of sleeve portion 19a is so positioned with respect to the back of deflector 36, 36a that the initial fluid discharge from the nozzle will tend to be a cylindrical stream which by air injection thereto becomes a laterally spreading mist; and retraction of sleeve 17 to the right causes a disk form mist to initially issue.

It has been found beneficial for air to be added into the water stream issuing from a fire hose nozzle, whereby to increase the volume and spread of the foam or mist.

Thus, a very large fire area can be covered. The air-supply 20, 21, previously mentioned, is provided as a simple and highly efficient improvement over such air-supply devices as have come to my attention.

It is noted that the head 21—which is rotatable in front of the fixed disc 20 carried by the sleeve enlargement 19—has a circular series of passages 41, 41a which lead into the convergent annular space 42 between the tapered head-end 21a and the tapered sleeve enlargement 19a, as clearly shown in FIG. 2. FIGS. 4 and 6 show that the fixed disc 20 has a pair of diametrically arranged arcuate slots 40; and FIG. 2 shows that these open into the rotary path of the passages 41. The head 21 may therefore be turned to vary the degree to which the passages and slots register, whereby to control the amount of air entering the head 21. It is understood that the force of the water stream issuing from the nozzle will draw air through the head 21 into mixing relation with the water stream, so that a spray or mist will result, with the advantage stated before.

It is now apparent that the novel air-supply unit is a simple and efficient attachment for the fire hose nozzle. It is entirely external and therefore directly accessible for rotary adjustment to vary the amount of air drawn into the water stream of the nozzle. While the screws 24 and 24 serve primarily as keys to retain the head 21 on the nozzle for adjustment in a true rotary path, screw 24 also serves as a locking element to station the head at any point to which it has been turned, and alter the air-content of the water spray accordingly.

Although the invention is primarily intended for the foam discharge nozzle setting, it is also applicable to a cylindrical stream setting thereof wherein the forward end of the flow carrier control sleeve such as 19 in FIG. 2 is anchored substantially beyond the plane of the center ends of a baffle or deflector such as 36, 36a in FIG. 2.

Having thus described my invention, what I claim is:

1. In a hose nozzle comprising an elongated, tubular base member having a through passage from end-to-end,
   said base member having means at one end for connection to a source of pressurized fluid,
   the other end of said base member comprising a fluid outlet;
   valve means fixed in said tubular base member and comprising a baffle member longitudnially spaced from and substantially axially overlying said fluid outlet;
   a control sleeve reciprocably supported on said base member and including a forward portion circumposed about said baffle member and controlling the degree of spray emitted from said fluid outlet; and manually operated means on said sleeve member including a portion operatively connected to said base member for effecting relative longitudinal movement between said sleeve and base member for effecting different degrees of spray emission, the improvement comprising:
   said sleeve including a terminal outer surface portion (19a) tapered axially toward the fluid outlet,
   air control means on said sleeve for providing a supplemental air stream intermixed with said spray for controlling the shape and character of the spray emitted from said fluid outlet,
   said air control means comprising a pair of juxtapose, annular collars circumjacent to said forward portion of said sleeve member,
   means on said sleeve member and said collars restraining the collars against axial movement relative to said sleeve and permitting relative rotation of one of said collars,
   said collars including axially communicating openings for permitting air to be aspirated therethrough,
   the forwardmost collar including an air-outlet directed into intersecting relation downstream of the fluid outlet axis and exteriorly of the terminal end of said sleeve for forceably directing air into the general path of the fluid spray emitted.

2. In the structure as claimed in cliam 1 in which said annular collars include a plurality of circumferentially spaced communicating openings, the rearwardmost collar being fixed against rotation on said sleeve, the opening on said rearwardmost collar comprising circumferentially-disposed, arcuate slots, the opening in said forewardmost collar comprising axial passages terminating in forward surfaces inclined axially and opening downwardly onto the tapered outer surface of said sleeve.

3. The structure as claimed in claim 1 in which said restraining means on said sleeve comprises an annular stop on said sleeve abutting the rearwardmost collar, and an annular groove underlying said forwardmost collar, and at least one radially disposed screw seated in said forwardmost collar and including an inner tip portion freely received in said annular groove for permitting the forwardmost collar to be rotated.

References Cited

UNITED STATES PATENTS

| | | |
|---|---|---|
| 2,089,646 | 8/1937 | Friedrich. |
| 3,210,012 | 10/1965 | Caird _____ 239—456 |
| 3,241,772 | 3/1966 | Thompson _____ 239—587 X |

FOREIGN PATENTS

| | | |
|---|---|---|
| 615,036 | 10/1925 | France. |

M. HENSON WOOD, Jr., Primary Examiner

J. J. LOVE, Assistant Examiner

U.S. Cl. X.R.

239—428.5, 456